United States Patent Office 2,771,370
Patented Nov. 20, 1956

2,771,370

FRENCH FRIED ONION RINGS AND THE METHOD OF MAKING SAME

Clyde H. Allen, Albion, Mich.

No Drawing. Application September 30, 1954,
Serial No. 459,511

4 Claims. (Cl. 99—193)

The present invention relates broadly to food products, and in its specific phases to onion rings and the method of preparing same.

In accordance with the standard practice in connection with preparing onion rings, these are cut and prepared directly on order since onion rings cannot be fully prepared, laid aside, and warmed up for serving since a major portion of their good qualities vanish under such treatment. The cooking of onion rings accordingly causes difficulties since in the restaurant where they are to be served, orders for the onion rings usually come in at a time when the cook is busy preparing the meals on order and has little time to devote to the preparation and cooking of onion rings. It was a recognition of these problems and difficulties in connection with the preparation of onion rings which led to the conception and development of the present invention.

Accordingly among the objects of the present invention is the provision of a satisfactory partially precooked onion ring product which can be converted into high quality finished onion rings on short notice, and the over-all method of producing finished onion rings through the utilization of this partial precooking step.

Another object is to provide a special way of preparing onion rings which will make them available in quantity on short notice, with minimum effort when they are wanted.

A further object of the present invention is to provide a process of preparing onion rings wherein they are partially cooked and then frozen to hold them for quick use when wanted.

A further object is to provide in connection with cooked ready to eat onion rings, a two step cooking procedure with a freezing step between them.

Still further objects and advantages of the present invention will appear as the description proceeds.

To the accomplishment of the foregoing and related ends the invention, then, consists of the onion ring product and methods of producing same as hereinafter fully described and particularly pointed out in the claims, the following description setting forth in detail certain means and modes of carrying out the invention, such disclosed means and modes illustrating, however, but one of the various ways in which the principle of the invention may be used.

The onions to be made into onion rings are preferably of medium or large size. These onions are first peeled and then sliced crosswise to produce slices approximately ¼ inch in thickness. The slices are then separated into rings ready for the batter coating step.

A good onion ring coating batter mix may be prepared from the following:

1¼ cups wheat flour
1 teaspoon salt
1 teaspoon baking powder
1 egg
1¼ cups milk or water
2 teaspoons fine ground paprika
1 teaspoon shortening, such as butter, or a good grade of salad oil.

The dry ingredients of the batter mix are sifted into a bowl, and the egg is separately well beaten and combined with the milk or water, and the shortening in liquid form. This liquid portion is then added all at once to the flour and stirred to make a smooth thick batter which must be thick enough to stick to the onion rings and stay on: In fact, it must be in the form of a batter almost too thick to pour. Since there is some variation in the mixtures, due to variations in egg sizes and the kind of shortening used, if it is found that the batter is too thin, then a little extra flour may be added, while if it appears to be too thick then a little extra water or milk may be added. If desired, the flour can be in the form of a blend of wheat and corn flours. Also, where only occasional use of batter is involved, if desired, a commercial batter mix, such as "Drake's Crispy Fry Mix," may be substituted for the mix described above.

The freshly cut onion rings are then pushed into the batter to make sure that they are completely coated with batter. The thus coated onion rings are then dropped into deep frying fat, of which vegetable oil is the best, and which is preferably at a temperature of approximately 360° to 365° F. The rings are cooked for approximately two minutes or until very light brown in color, to substantially completely cook the batter, but not the onion, with the rings being turned once or twice while cooking to insure uniformity both in cooking and in color. The rings are removed immediately from the hot fat and allowed to drain for approximately one minute. This draining can take place on a wire screen drainer but a little better results are obtained where the onion rings are placed upon an absorbent material. At the end of the one minute draining time, the onion rings are quickly packaged, or placed in a suitable bulk container, and immediately placed in a freezer at zero Fahrenheit or slightly lower. It is important that the draining time be held close to one minute since if much greater time is allowed between the cooking and freezing steps, the onion rings tend to become soft and to stick together when frozen. This sticking together is also accentuated when the batter is not substantially completely cooked before draining.

When a call comes for a serving of onion rings, they are removed from the freezer, and without thawing, they are dropped directly into the deep frying fat which is preferably at a temperature in the range of approximately 370° to 375° F., where they are allowed to cook from two to three minutes or until golden brown in color. During this final cooking, the rings are turned over once or twice to insure uniformity both in cooking and in color. The frozen onion rings in this partially precooked form may be kept indefinitely in the frozen state, and when finished ready for serving are equal in quality and flavor to onion rings which have been completely cooked in one step.

Other modes of applying the principle of my invention may be employed instead of the one explained, change being made as regards the onion ring product and the methods of producing same as herein described, provided those stated by any of the following claims or their equivalent be employed.

I therefore particularly point out and distinctly claim as my invention:

1. The method of preparing fried onion rings, which comprises preparing raw onion rings, coating the rings with a thick batter, cooking the batter-coated rings in hot deep fat for about two minutes to render only the batter cooked and non-sticky and the onion rings only partially cooked, removing the onion rings from the hot fat, quickly draining for a period limited to prevent same from becoming soft and sticky, and rapidly freezing same, removing the frozen onion rings and without thawing cooking the partially precooked rings in hot deep fat until golden brown in color.

2. The method of preparing onion rings as set forth in claim 1, wherein the temperature of said hot deep fat for the first cooking is approximately 360° to 365° F., and the first cooking time is approximately two minutes; wherein the draining time is approximately one minute; wherein these onion rings are immediately frozen at a temperature in the neighborhood of 0° F.; and wherein the temperature of the deep fat for the second cooking is approximately 370° to 375° F., and the cooking time for said second cooking is approximately two to three minutes.

3. The method of preparing fried onion rings, which comprises preparing raw onion rings, coating the rings with a thick batter, cooking the batter-coated rings in hot deep fat for about two minutes to render only the batter cooked and non-sticky and the onion rings only partially cooked, removing the onion rings from the hot fat, quickly draining for a period limited to prevent same from becoming soft and sticky, and rapidly freezing same.

4. The method according to claim 3 in which the temperature of the hot deep fat is in the range of 360° to 365° F., and the draining time is approximately one minute.

References Cited in the file of this patent

UNITED STATES PATENTS

| | | |
|---|---|---|
| 1,955,484 | Birdseye | Apr. 17, 1934 |
| 2,166,278 | Alderfer | July 18, 1939 |
| 2,674,536 | Fisher | Apr. 6, 1954 |

FOREIGN PATENTS

| | | |
|---|---|---|
| 646,499 | Great Britain | Nov. 22, 1950 |

OTHER REFERENCES

"Packaging Parade," May 1945, pages 36 and 41 article entitled, "Partially Pre-Cooked Meals Packaged as Individual Servings, Frozen by Special Process, Stored Until Needed."

"Quick Frozen Foods," June 1949, page 68.

"Modern Encyclopedia of Cooking," volume II, 1949, by Meta Given, published by J. L. Ferguson and Associates, Chicago, page 1539, article entitled, "French-Fried Onions."